UNITED STATES PATENT OFFICE.

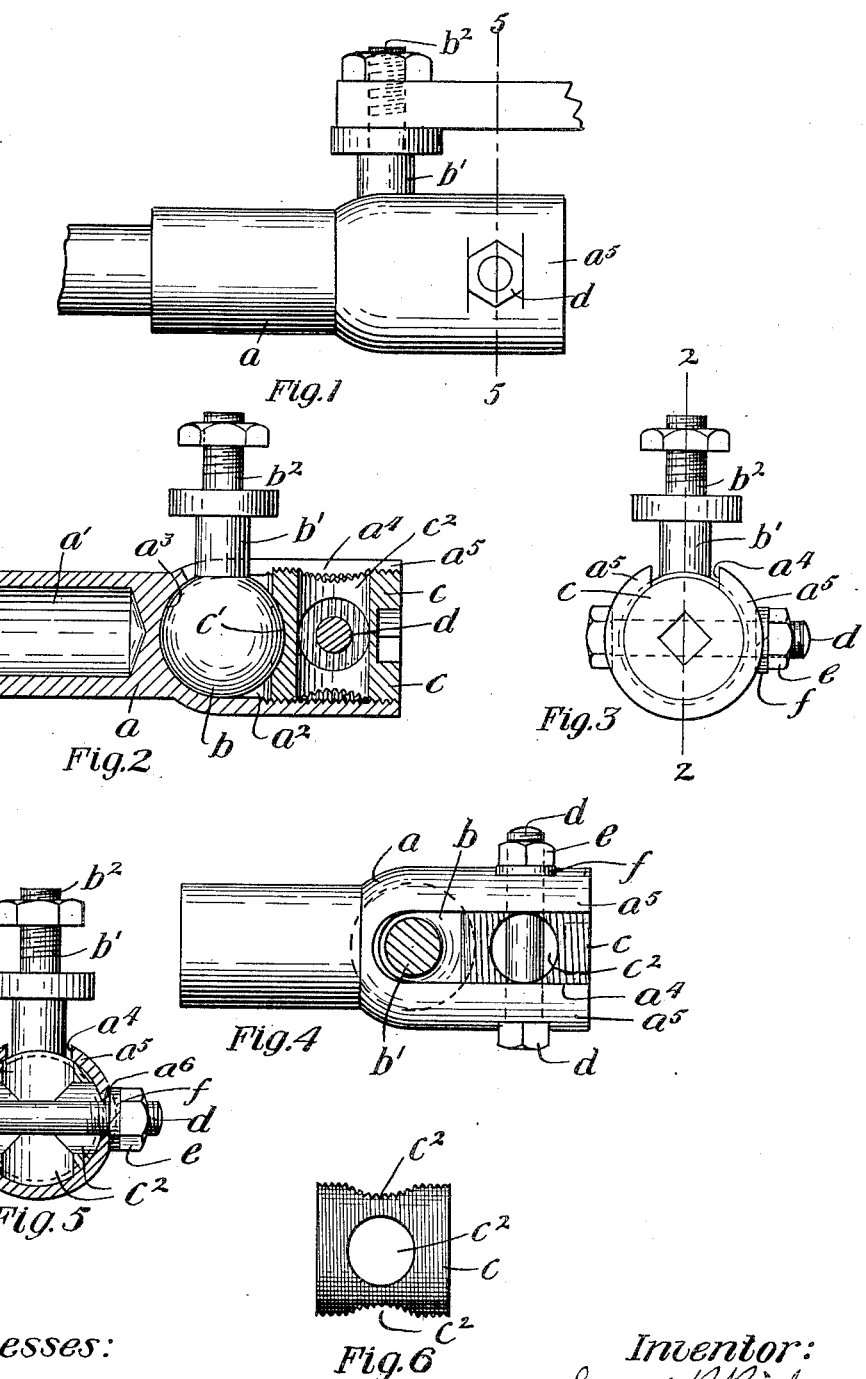

SAMUEL R. BAILEY, OF AMESBURY, MASSACHUSETTS.

BALL-AND-SOCKET CONNECTION.

1,097,384.

Specification of Letters Patent. Patented May 19, 1914.

Application filed September 22, 1911. Serial No. 650,765.

*To all whom it may concern:*

Be it known that I, SAMUEL R. BAILEY, a citizen of the United States, residing at Amesbury, in the county of Essex and State of Massachusetts, have invented an Improvement in Ball-and-Socket Connections, of which the following is a specification.

This invention relates to that class of ball and socket connections which are extensively used in the construction of automobiles, and in various other relations.

Prior to my invention various forms of joints of this character have been produced, but, so far as I am aware, these devices are not adapted to be made by automatic machinery, but only by machinery which requires more or less hand manipulation.

The object of my invention is to produce a ball and socket connection which may be almost entirely made in an ordinary automatic screw machine, so that the manufacturing cost may be reduced, and which is adapted to be readily assembled and adjusted, and to be locked so that it will not become unlocked in use, under reasonable or ordinary conditions. I accomplish these objects by the means shown in the accompanying drawing, in which:—

Figure 1 is a side elevation of a ball and socket connection made according to my invention. Fig. 2 is a longitudinal sectional view on the line 2—2 of Fig. 3. Fig. 3 is an end view thereof. Fig. 4 is a plan view. Fig. 5 is a transverse section on line 5—5 of Fig. 1. Fig. 6 is a detail view of the bearing plug.

As shown in the drawing, the connection comprises a steel socket member $a$ having a recess $a'$ in one end thereof, adapted to receive a brace rod, or other part of the structure to which the device is attached. A longitudinal bore is formed in the opposite end of said socket member to provide a ball-receiving chamber $a^2$, which terminates in a spherical seat $a^3$, and a slot is provided in the side of said chamber which extends from the outer end thereof to the seat $a^3$, and provides a pair of clamping walls $a^5$, as will be hereafter explained. The ball member of the coupling comprises a ball $b$, adapted to fit against the seat $a^3$, and of slightly less diameter than that of said chamber $a^2$, said ball being provided with the usual stem $b'$, which is adapted to pass freely through slot $a^4$, and a threaded shank $b^2$, adapted to be attached to the structure. Screw plug $c$ is threaded in the outer end portion of said chamber $a^2$, said plug being provided with a spherical seat $c'$, on its inner end, for the ball $b$, so that, when the plug is screwed into the chamber $a^2$, it may bear against the opposite side of the ball from the seat $a^3$, the ball being thereby held therebetween. Plug $c$ is provided with two or more transverse holes $c^2$, arranged at right angles approximately mid-way thereof and the middle portions of the clamping walls $a^5$ are provided with oppositely disposed apertures $a^6$, equidistant from the sides of slot $a^4$ and opposite the longitudinal center of the chamber $a^2$, so that the ends of the holes $c^2$ may be brought into register therewith. Said holes $c^2$ are of materially greater diameter than that of apertures $a^6$, and are made as large as possible without unduly weakening the plug $c$. A bolt $d$ is provided which is adapted to fit the holes $a^6$ in the walls $a^5$, and pass through the holes $c^2$ of plug $c$, in different positions of the latter, said bolt being of sufficient length to provide a protruding end, on which a nut $e$ is threaded.

In assembling the parts, the ball is passed through the open end of the chamber and its stem through the slot $a^4$. The plug is then screwed into the chamber $a^2$ until the ball is clamped between the seat thereof and the seat $a^3$. The bolt $d$ is then inserted, and, as the holes $c^2$ are of materially greater diameter than the diameter of the bolt, it follows that neither hole needs to be in exact alinement with the bolt, in order that the bolt may pass therethrough, and adjustment of the plug to various positions is permitted. As the socket member is made of steel or similar slightly yielding material, it will be obvious that, when the nut $e$ is tightened on the bolt, the walls $a^5$ will be tightly clamped against the sides of the screw-plug $c$, holding the latter securely in position.

In practice the wall against which the head of the bolt bears is slotted so as to hold the bolt from turning, and a spring-washer $f$ is provided to hold the nut from unscrewing. When the bolt $d$ is in position, and its nut tightened, it performs several functions. It not only prevents the plug $c$ from becoming loosened or unscrewed by the clamping of the sides $a^5$ against it, but in case the nut $f$ should become loosened, so that the sides $a^5$ were no longer held in clamping engagement with the plug, the bolt will act positively to prevent the plug from becoming unscrewed to more than a slight extent. For convenience in assembling the parts the slot $a^4$ is very desirable and, while it weakens the walls of the ball-receiving chamber, the extent which they are weakened is more than counteracted by the extent which they are reinforced by the bolt.

The above described parts are adapted to be made in an automatic screw machine without difficulty, so that the whole device may be produced at small expense.

I claim:

1. A ball and socket connection comprising a ball member consisting of a ball and its connecting stem, an elongated socket member having a longitudinally-extending ball-receiving chamber opening at one end thereof and providing a ball-receiving seat at its inner end, the side of said chamber having a longitudinal stem-receiving slot extending from the outer end thereof and provding oppositely-disposed clamping walls, a plug threaded in said chamber and having a ball-receiving seat at its inner end, a bolt passing loosely through said plug, and through said walls at approximately equal distances from said slot, and means engaging the end of the bolt to clamp said walls against the sides of the plug, substantially as described.

2. A ball and socket connection comprising a ball member consisting of a ball and its connecting stem, an elongated socket member having a longitudinally-extending ball-receiving chamber opening at one end thereof and providing a ball-receiving seat at its inner end, the wall of said chamber having a longitudinal stem-receiving slot extending from the outer end thereof and providing oppositely disposed clamping walls, a plug threaded in said chamber having a ball-receiving seat at its inner end and a plurality of transverse holes through the center thereof, a clamping-bolt adapted to extend loosely through either of said holes, and through said clamping-walls at approximately equal distances from said slot, and means engaging the end of the bolt to clamp said walls against the plug substantially as described.

In testimony whereof, I have signed my name to this specification, in the presence of two subscribing witnesses.

SAMUEL R. BAILEY.

Witnesses:
L. H. HARRIMAN,
H. B. DAVIS.

---

Copies of this patent may be obtained for five cents each, by addressing the "Commissioner of Patents, Washington, D. C."